(12) United States Patent
DeMasi et al.

(10) Patent No.: US 6,756,075 B2
(45) Date of Patent: Jun. 29, 2004

(54) IN-PRESS COATING METHOD AND COMPOSITION

(75) Inventors: Anne Seton DeMasi, Philadelphia, PA (US); Rosemarie Palmer Lauer, Chalfont, PA (US)

(73) Assignee: Rohm and Haas Company, Philadelphia, PA (US)

( * ) Notice: Subject to any disclaimer, the term of this patent is extended or adjusted under 35 U.S.C. 154(b) by 215 days.

(21) Appl. No.: 10/081,681

(22) Filed: Feb. 25, 2002

(65) Prior Publication Data

US 2002/0171170 A1 Nov. 21, 2002

Related U.S. Application Data

(60) Provisional application No. 60/277,010, filed on Mar. 19, 2001.

(51) Int. Cl.⁷ .................................................. B05D 3/12
(52) U.S. Cl. ...................................................... 427/370
(58) Field of Search ......................................... 427/370

(56) References Cited

U.S. PATENT DOCUMENTS

| | | |
|---|---|---|
| 3,494,878 A | 2/1970 | Harren et al. |
| 4,517,228 A | 5/1985 | Matejka et al. |
| 4,940,741 A | 7/1990 | De Wacker et al. |
| 5,059,264 A | 10/1991 | Sheets |
| 5,527,853 A | 6/1996 | Landy et al. |
| 5,747,110 A * | 5/1998 | Tallentire et al. ............ 427/244 |
| 5,792,513 A * | 8/1998 | Koslow et al. ............. 427/195 |
| 5,922,777 A | 7/1999 | Van Rheenen |
| 5,947,632 A | 9/1999 | Pirotta et al. |
| 6,475,556 B1 | 11/2002 | Sobczak et al. |

FOREIGN PATENT DOCUMENTS

| | | |
|---|---|---|
| EP | 0837110 B1 | 5/2000 |
| JP | 10-119014 * | 5/1998 |
| WO | WO 00/27635 | 5/2000 |

* cited by examiner

*Primary Examiner*—Erma Cameron
(74) *Attorney, Agent, or Firm*—Karl Stauss

(57) ABSTRACT

A method and composition are provided for applying a single aqueous coating composition to a composite substrate during an in-press molding operation to achieve (i) improved initial whiteness in a white pigmented composition, (ii) excellent color retention/stability and (iii) excellent press release properties. The aqueous coating composition incorporates an ion exchange resin and serves as a combined sealer and topcoat finish for press molded composite substrates.

6 Claims, No Drawings

IN-PRESS COATING METHOD AND COMPOSITION

CROSS REFERENCE TO RELATED PATENT APPLICATIONS

This is a non-provisional application of prior pending U.S. provisional application serial No. 60/277,010 filed Mar. 19, 2001.

The present invention relates to a method of manufacturing an in-press coated composite substrate having an aqueous composition applied as a combined sealer and topcoat finish. More particularly the present invention relates to the incorporation of ion exchange resin into the aqueous coating composition to achieve (i) improved initial whiteness in a white pigmented composition, (ii) excellent color retention/stability and (iii) excellent press release properties; in a single coating composition for pressboard applications.

PCT Patent Application Ser. No. PCT/US99/25959, published as WO 00/27635, discloses the use of a quick or rapid setting primer coating composition for in-mold or pressboard applications to improve the surface quality and release characteristics of the coated substrate. Such characteristics include low porosity, smoothness, hardness, flexibility, blocking resistance, moisture resistance and adherence to subsequently applied coating compositions. However, such compositions can exhibit insufficient uniformity of the coating across the surface of the substrate, in that the coating composition needs to obtain uniform fiber coverage across the substrate. Additionally, such compositions can exhibit yellowing and color stabilization problems. Moreover, the use of ion exchange resin in aqueous coating compositions for in-mold or pressboard applications is not disclosed.

The problem addressed by the invention is to provide a single in-mold or pressboard coating composition that exhibits excellent initial whiteness, color stability/retention and press release properties along with traditional surface characteristics required of in-mold pressboard coating applications. The incorporation of ground ion exchange resin into an aqueous pigmented pre-press sealer coating composition achieves this objective.

The present invention provides a method for the manufacture of an in-press coated composite substrate, comprising:

(a) applying an aqueous coating composition to a surface of a compressible mat comprising fibers, chips or particles and a resin;

(b) compressing the mat and applied coating composition between heated metal surfaces in a press; and (c) releasing the compressed, coated composite substrate from the press;

characterized in that the aqueous coating composition comprises an aqueous emulsion copolymer and a ground ion exchange resin. The present invention further provides an aqueous coating composition for in-press molded composite substrates comprising an emulsion polymer and ground ion exchange resin wherein said coated composite substrate exhibits improved mold release properties, color stability and initial whiteness as compared with identical coatings without the ion exchange resin.

In the manufacture of consolidated wood products, including hardboard, fiberboard, particleboard and the like (also referred to as "pressboard" or as a "composite substrate"), wood fibers, chips or particles are mixed with a thermoset resin, formed into a mat and then compressed at high temperature and pressure to yield the desired product. Other types and combinations of fibers, chips, particles and resin may be used in the composite substrate, including cellulose, glass, synthetic polymers, carbon and organic or inorganic cementitious compositions. The product may take many forms but is usually in the form of a sheet or board. In many applications, prior to compression, a waterborne pre-press sealer is applied to the wet or dry fiber/chip/particle mat to provide hot press release and to aid in the consolidation of the board surface. After removal from the press, a pigmented, aqueous topcoat, or aqueous sealer followed by an aqueous topcoat, may be further applied to improve aesthetic and surface characteristics of the unfinished board. Such characteristics include low porosity, smoothness, hardness, flexibility, blocking resistance, moisture resistance and adherence to subsequently applied coating compositions, in order to protect the board during storage and handling. A further goal of the sealer/topcoat is to provide color stabilization, that is, to prevent the migration of tannins and other undesirable colored wood extracts from the wood fiber/chip/particle board into the coating, thereby preserving the aesthetic appearance of the coated wood under adverse conditions, including, humidity, heat and water contact.

Manufacturers of fiber/chip/particle board have long sought after a single waterborne pre-press coating that would serve the dual purposes of both the pre-press and post-press finishes. In so doing, both the sealer and topcoat application steps could be eliminated from the post-press board manufacturing process, promoting faster line speeds and higher productivity while reducing energy consumption. One problem faced by the industry is that the thicker coating required to perform both pre-press and post-press functions often leads to unacceptable adhesion to the press plates. Another problem is color stability/retention in that the usually white coating emerges from the hot press yellowed or darkened, most likely as a result of contamination/leaching of tannins and other colored species from the wood fiber/chip/particle substrate. The darkened coatings vary in intensity and can "bleach out" when exposed to ultraviolet (UV) light, creating undesirable variations in color across the substrate surface during storage. Another problem is the uniformity of the coating across the surface of the substrate, in that the coating composition needs to obtain uniform fiber coverage across the substrate.

The present invention addresses the above problems by providing a single in-mold or pressboard coating composition that exhibits excellent initial whiteness (for a white pigmented composition), color stability/retention and press release properties along with traditional surface characteristics required of in-mold pressboard coating applications. The coating composition of the present invention incorporates ground ion exchange resin in the form of pre-slurry into an aqueous pigmented pre-press sealer coating composition. The particle size of the ground ion exchange resin ranges from 0.1 to 50 microns and can be an anion or cation exchange resin. The ion exchange resin may also be classified as many types of resins, including mixed bed resins, macroreticular resins or other known resins, including a combination of resins. The ion exchange resin is effective at low levels, including at least 1.5 percent solid ion exchange resin on coating polymer solids.

Coating compositions frequently contain emulsion polymers. Emulsion polymers as used herein are defined as compositions containing an emulsion-polymerized, water-insoluble addition polymer with a glass transition temperature ("Tg") of from −50 degrees centigrade ("° C.") to 150° C., more particularly from −10° C. to 120° C. "Glass transition temperature" or "$T_g$" as used herein, means the temperature at or above which a glassy polymer will undergo segmental motion of the polymer chain. Glass transition temperatures of a polymer can be estimated by the Fox equation [Bulletin of the American Physical Society 1, 3, page 123 (1956)] as follows:

$$\frac{1}{T_g} = \frac{w_1}{T_{g(1)}} + \frac{w_2}{T_{g(2)}}$$

For a copolymer of monomers $M_1$ and $M_2$, $w_1$ and $w_2$ refer to the weight fraction of the two co-monomers, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The $T_g$ of a polymer can also be measured by various techniques including, for examples, differential scanning calorimetry ("DSC"). The particular values of $T_g$ reported herein are calculated based on the Fox equation.

The glass transition temperatures of homopolymers may be found, for example, in "Polymer Handbook", edited by J. Brandrup and E. H. Immergut, Interscience Publishers.

The emulsion polymer may be prepared by the addition polymerization of at least one ethylenically unsaturated monomer such as, for example, acrylic ester monomers including methyl acrylate, ethyl acrylate, butyl acrylate, 2-ethylhexyl acrylate, decyl acrylate, methyl methacrylate, butyl methacrylate, hydroxyethyl methacrylate, and hydroxypropyl acrylate; acrylamide or substituted acrylamides; styrene or substituted styrenes; butadiene; vinyl acetate or other vinyl esters; vinyl monomers such as vinyl chloride, vinylidene chloride, N-vinyl pyrolidone; and acrylonitrile or methacrylonitrile. Low levels of copolymerized ethylenically unsaturated acid monomers such as, for example, 0.1%–7%, by weight based on the weight of the emulsion-polymerized polymer, acrylic acid, methacrylic acid, crotonic acid, phosphoethyl methacrylate, 2-acrylamido-2-methyl-1-propanesulfonic acid, sodium, vinyl sulfonate, itaconic acid, fumaric acid, maleic acid, monomethyl itaconate, monomethyl fumarate, monobutyl fumarate, and maleic anhydride may be used. Preferred are butyl acrylate, 2-ethylhexyl acrylate, methyl methacrylate, butyl methacrylate, acrylic acid, methacrylic acid, and styrene copolymers thereof. Preferred acrylic copolymers with styrene contain from 10% to 90% styrene based on the total weight of the polymer. The polymers may be single-stage or multi-stage polymers.

The coating composition may contain a crosslinking agent, such as, for example, a polyaziridine, polyisocyanate, polycarbodiimide, polyepoxide, polyaminoplast, polyalkoxy silane, polyoxazolidine, polyamine and a polyvalent metal compound; providing that the crosslinking agent does not inhibit film formation. Typically, from 0.05 weight percent to 30 weight percent of the crosslinking agent is used, based on the weight of the polymer solids. The coating composition can be a fast setting composition so that the crosslink bonding can occur rapidly via ionic or covalent bonding as it is applied to the surface of the compressible mat. Such coating compositions are known in the art, particularly as traffic paints.

The emulsion polymer may be blended with other polymers, such as, for example, a polyurethane, a polyester, an acrylic copolymer, a styrene/acrylic copolymer, or other polymers. The emulsion polymer may also be a hybrid of polymers.

The emulsion polymerization techniques used to prepare such thermoplastic emulsion polymers are well known in the art. See, for example, U.S. Pat. No. 5,346,954. Multi-stage polymers are well known in the art and are disclosed, for example, in U.S. Pat. Nos. 4,325,856, 4,654,397, and 4,814,373. Surfactants such as, for example, anionic and/or nonionic emulsifiers such as alkali or ammonium alkyl sulfates, alkyl sulfonic acids, fatty acids, and oxyethylated alkyl phenols may be used in this polymerization. The amount of surfactant used is usually 0.1% to 6% by weight, based on the weight of total monomer. Either thermal or redox initiation processes may be used. The reaction temperature is maintained at a temperature lower than 100° C. throughout the course of the reaction. Preferred is a reaction temperature between 30° C. and 95° C., more preferably between 50° C and 90° C. The monomer mixture may be added neat or as an emulsion in water. The monomer mixture may be added in one or more additions or continuously, linearly or not, over the reaction period, or combinations thereof.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used.

Chain transfer agents such as, for example, halogen compounds such as tetrabromomethane; allyl compounds; or mercaptans such as alkyl thioglycolates, alkyl mercaptoalkanoates, and $C_4$–$C_{22}$ linear or branched alkyl mercaptans may be used to lower the molecular weight of the emulsion polymer and/or to provide a different molecular weight distribution than would otherwise have been obtained with any free-radical-generating initiator(s). Linear or branched $C_4$–$C_{22}$ alkyl mercaptans such as n-dodecyl mercaptan and t-dodecyl mercaptan are preferred. Chain transfer agent(s) may be added in one or more additions or continuously, linearly or not, over most or all of the entire reaction period or during limited portion(s) of the reaction period such as, for example, in the kettle charge and in the reduction of residual monomer stage. The use of chain transfer agent in the amount of 0 to 5 wt %, based on the total weight of monomer used to form the aqueous emulsion copolymer is effective to provide a GPC weight average molecular weight of 1000 to 5,000,000. Preferred is the use of 0 to 1 wt % chain transfer agent, based on the total weight of monomer used to form the aqueous emulsion copolymer. Conventional free radical initiators may be used such as, for example, hydrogen peroxide, t-butyl hydroperoxide, ammonium and alkali persulfates, typically at a level of 0.05% to 3% by weight, based on the weight of total monomer. Redox systems using the same initiators coupled with a suitable reductant such as, for example, isoascorbic acid and sodium bisulfite may be used at similar levels.

The solids content of the emulsion polymer is from 20% to 70% by weight. The viscosity of the emulsion polymer is from 50 centipoises ("cps") to 10,000 cps, as measured using a Brookfield viscometer (Model LVT using spindle #3 at 12 rotations per minute).

The coating composition may contain, in addition to the emulsion polymerized polymer, conventional components such as, for example, extenders such as calcium carbonates, talcs, clays; emulsifiers, pigments and fillers, dispersants, coalescing agents, curing agents, thickeners, humectants, wetting agents, biocides, plasticizers, antifoaming agents, colorants, waxes, and antioxidants. The amount of the emulsion polymer in the coating composition is from 20% to 97.5% on a weight basis.

As described earlier, ion exchange resins are used in the present invention to provide initial whiteness (for white pigmented compositions), color stability/retention and release properties for in-press molding applications. The ion exchange resins are typically cross-linked styrene polymers with functional groups such as, for example, sulfonamide, trialkylamino, tetraalkyl ammonium, carboxyl, carboxylate, sulfonic, sulfonate, hydroxyalkyl ammonium, iminodiacetate, amine oxide, phosphonate, and others known in the art. The ion exchange resins may be macroreticular resins. The preparation of ion exchange resins is known in the art, see for example, U.S. Pat. No. 4,283,499 and EP Pat. No. 0 837 110 B1.

Prior to addition to the coating composition, the ion exchange resin may be pre-treated by admixing the ion exchange resin with a water soluble anionic polymer. By pre-treatment is meant contacting, admixing, or coating. The pre-treatment provides stability as defined as a grit-free composition when mixed with anionic paint components, such as emulsion polymers and pigment dispersions. Pre-treatment may occur by grinding the ion exchange resin in the presence of the water soluble anionic polymer. Pre-treatment may also occur by grinding the ion exchange resin separately, and then admixing the ion exchange resin with the water soluble anionic polymer.

Ion exchange resins may be ground by any milling equipment suitable for producing particles in the size range of 0.1 to 50 microns, more preferably 0.25 microns to 35 microns, and most preferably from 0.5 microns to 25 microns. The particle size may be measured on a Coulter™ LS, light scattering, particle size analyzer. Suitable mills are attrition mills, fluid-energy mills, colloid mills, vibratory ball mills (vibro-energy mills), pin mills, ball mills, roller mills, and autogenous and semiautogenous mills. Likewise a combination of mills could be used to possibly increase speed where the first mill reduces particle size to, for example, 100 to 1000 microns and a second mill reduces the particle size further to the desired range. An example would be the initial use of a hammer mill followed by a semi-autogenous mill like a Dyno-Mill™ from CB Mills Inc (Buffalo Grove, Ill.).

The ground ion exchange resin may be pre-dispersed, pre-blended or mixed in a "carrier" binder to facilitate transfer and handling of the materials. The ground ion exchange resin may be pre-dispersed on a weight basis of 25%–75% ground ion exchange resin, more preferably 30%–60% (i.e., ion exchange resin solid on latex polymer solid). The "carrier" binder for the dispersion may be anionic, cationic or non-ionic.

The aqueous composition may applied by conventional application methods such as, for example, brushing and spraying methods such as, for example, roll coating, doctor-blade application, curtain coating, printing methods, air-atomized spray, air-assisted spray, airless spray, high volume low pressure spray, and air-assisted airless spray.

The following examples are presented to illustrate the invention and the results obtained by the test procedures and are not meant to limit the scope of the present invention.

EXAMPLE 1

Preparation of an Aqueous Coating Composition Containing Ion Exchange Resin This example shows how to prepare an aqueous coating composition containing an ion exchange resin used in later examples to evaluate properties. The aqueous coating composition is prepared according to standard paint formulation techniques known by one skilled in the art and according to the general formulation described herein. A binder, such as Rhoplex Fastrack 2706 of Rohm and Haas Company, is formulated with pigment, extenders, dispersant, defoamer and a wetting aid. The binder is weighed in a container.

A strong base ion exchange resin (IER) slurry, also referred to as an anion exchange resin, is prepared by placing 148.7 g of Amberjet® 4400 Cl by Rohm and Haas Company with 251.3 g deionized water into a container. Thereafter, the mixture is added to a grinding bucket containing approximately 2284 g of ½" by ½" (1.27 cm by 1.27 cm) Zr beads and placed on a shaker for 4 to 6 hours. The resulting solid level is approximately 20%.

A strong base ion exchange resin slurry pre-treated with water soluble anionic polymer may be prepared by premixing 33 g of maleic acid, 12 g of Acusol® 479N (40% solids) by Rohm and Haas Company, and 255 g deionized water into a container. To the premix is added 300 grams of Amberjet® 4400 OH resin (40% solids) by Rohm and Haas Company. A grinding bucket is filled with 1" by 1" (2.54 cm by 2.54 cm) grinding media stacked 3 high. The resin mixture is poured into the grinding bucket and placed on a shaker for 3 hours. The resulting solids are approximately 20%.

For this example 1, strong base ion exchange resin is used. While stirring, the ground ion exchange resin slurry (3–20 microns) is added to the binder at a level of 1.7–13.3% based on solids. While stirring, the defoamer, dispersant, surfactant, and water are added to the binder/slurry mixture. In a separate container, the pigment and extenders are weighed together. The container with the liquids is then placed under a bench top dispersator and turned on at a low to medium speed. Slowly, the pigment/extender mix is added to the container. After all ingredients are added together, the speed is increased until a vortex is reached. If necessary, the outside of the container is tapped to force any dry mix stuck to the inside of the container into the liquid. This is allowed to stir for 10 minutes.

TABLE 1.1

Formulation ingredients used in aqueous coating composition Based on 100 gallon formulation with 3.3% ground IER on latex polymer solids

| Material Name | Pounds | Level | Category |
|---|---|---|---|
| Rhoplex Fastrack 2706 | 514.74 | | Binder |
| Ground IER slurry | 42.90 | | Strong Base IER |
| Drewplus L-475 | 3.24 | | Defoamer |
| Tamol 901 | 14.85 | 0.65% | Dispersant |
| Surfynol TG | 6.61 | | Surfactant |
| Water | 55.83 | | |
| Tiona RCL-9 | 190.52 | 9.90% | PVC |
| Atomite | 454.87 | 35.84% | PVC |
| Polygloss 90 | 40.15 | 3.29% | PVC |
| Totals | 1323.70 | | |

| Property | Value |
|---|---|
| Total PVC | 49.02% |
| Volume Solids | 56.31% |
| Weight Solids | 72.20% |

RHOPLEX and TAMOL are trademarks of Rohm and Haas Company; SURFYNOL is a trademark of Air Products; TIONA is a trademark of Millenium Inorganic Chemicals; ATOMITE is a trademark of ECC America; DREWPLUS is a trademark of Drew Industrial Div., Ashland Chemical Ind.; and POLYGLOSS is a trademark of J. M. Huber Corporation.

EXAMPLE 2

Formulations of Aqueous Compositions Containing Ion Exchange Resin

This example shows specific aqueous coating compositions that are prepared according to the procedure described in Example 1. Three types of binders and two forms of ground ion exchange resin slurries are shown in this example, highlighting the versatility of this invention across a broad spectrum of coating compositions. The following binders, commercially available from Rohm Company, are:

Rhoplex Fastrack 2706 (FT-2706)—fast setting acrylic binder

EI-2000—sterically stabilized non-fast setting acrylic binder

Rhoplex 2500—anionically stabilized non-fast setting acrylic binder

The above binders are blended with ground anion exchange resin and polymer treated ground anion exchange resin as shown in the following table. Such compositions are then evaluated as described in further examples. All binders and ion exchange resins are available from Rohm and Haas Company.

TABLE 2.1

| Sample | Binder | % Anion Exchange Resin | % Polymer Treated Anion Exchange Resin |
|---|---|---|---|
| 1 | FT-2706 | 0 | 0 |
| 2 | FT-2706 | 0 | 1.7 |
| 3 | FT-2706 | 0 | 3.3 |
| 4 | FT-2706 | 0 | 6.7 |
| 5 | FT-2706 | 0 | 13.3 |
| 6 | EI-2000 | 0 | 0 |
| 7 | EI-2000 | 0 | 1.7 |
| 8 | EI-2000 | 0 | 3.3 |
| 9 | EI-2000 | 0 | 6.7 |
| 10 | EI-2000 | 0 | 13.3 |
| 11 | Rhoplex 2500 | 0 | 0 |
| 12 | Rhoplex 2500 | 0 | 1.7 |
| 13 | Rhoplex 2500 | 0 | 3.3 |
| 14 | Rhoplex 2500 | 0 | 6.7 |
| 15 | Rhoplex 2500 | 0 | 13.3 |
| 16 | FT-2706 | 1.7 | 0 |
| 17 | FT-2706 | 3.3 | 0 |
| 18 | FT-2706 | 6.7 | 0 |
| 19 | FT-2706 | 13.3 | 0 |
| 20 | EI-2000 | 1.7 | 0 |
| 21 | EI-2000 | 3.3 | 0 |
| 22 | EI-2000 | 6.7 | 0 |
| 23 | EI-2000 | 13.3 | 0 |
| 24 | Rhoplex 2500 | 1.7 | 0 |
| 25 | Rhoplex 2500 | 3.4 | 0 |
| 26 | Rhoplex 2500 | 6.7 | 0 |
| 27 | Rhoplex 2500 | 13.3 | 0 |

EXAMPLE 3

Release Properties, Color Retention

This example describes the methods to employ for preparing a coated substrate of the present invention and the examination of release and color retention properties. Formulated samples from Example 2 are sprayed over a 3" by 3" (7.62 cm by 7.62 cm) fiber mat, available from Lilly Industries, Inc., using a conventional spray gun at 30 psi (206.84 kPa). The first coat of about 1.5 grams is applied and dried under ambient conditions for 30 seconds followed by a second coat of about 1.5 grams. The sample is placed sprayed-side-up in the press and covered with a teflon-coated aluminum panel. The combination is pressed in a Carver press for 1 minute at 210° C. and an applied pressure of 10,000 pounds (4.5 metric tons) to a thickness of 3/16" (0.47625 cm). The resulting board is removed from the press. The release from the teflon-coated panel is determined qualitatively based on a number rating system as shown below:

10—good release—mat slides off platen with no external force

08—very very slight stick—removed very easily with little force

06—very slight stick—removed easily with little force

04—slight stick—removed somewhat easily with slight force

01—stick—removed with significant force

The L*a*b* values of the resulting coated board are measured using a Gardner Colorimeter using the CIE L*a*b* scale. The L* value is relative measure of the degree of whiteness/blackness on a scale from 0–100 (0=black, 100=white). The a* values indicate degree of redness/greenness. The b* values are an indication of yellowness/blueness. A positive b* value indicates increasing yellowness.

Coated boards are placed in a QUV unit (Type A bulb, 8 hours light, 4 hours condensation) for 10 days. Half of each board is masked prior to being placed in the unit. The L*a*b* values for the masked and unmasked portions of the boards are measured after 10 days.

Table 3.1 shows release properties and initial L*a*b* values for the samples in Example 2. Table 3.2 shows the L*a*b* values after 10 days of QUV exposure for the samples in Example 2.

TABLE 3.1

Press Release and Initial L*a*b* Values

| | | Initial | | |
|---|---|---|---|---|
| Sample | Press Release | L* | a* | B* |
| 1 | 1 | 92.47 | 1.74 | 6.10 |
| 2 | 4 | 93.96 | 1.25 | 4.86 |
| 3 | 6 | 93.63 | 0.89 | 4.82 |
| 4 | 8 | 94.16 | 0.02 | 4.49 |
| 5 | 10 | 93.85 | −0.08 | 4.32 |
| 6 | 1 | 89.10 | 0.05 | 5.23 |
| 7 | 2.5 | 91.13 | −0.13 | 4.74 |
| 8 | 5 | 90.96 | −0.22 | 3.88 |
| 9 | 10 | 92.98 | −0.42 | 3.72 |
| 10 | 20 | 90.33 | −0.15 | 3.70 |
| 11 | 2.5 | 90.23 | −0.09 | 4.77 |
| 12 | 2.5 | 91.69 | −0.13 | 4.35 |
| 13 | 6 | 91.95 | −0.08 | 4.71 |
| 14 | 6 | 91.61 | −0.09 | 4.31 |
| 15 | 10 | 94.45 | −0.23 | 3.59 |
| 16 | 9 | 93.34 | 1.41 | 6.11 |
| 17 | 9 | 94.42 | 0.59 | 5.01 |
| 18 | 10 | 95.21 | −0.01 | 4.33 |
| 19 | 9 | 95.35 | −0.41 | 3.90 |
| 20 | 4 | 89.29 | 0.03 | 4.82 |
| 21 | 4 | 87.78 | 0.14 | 4.74 |
| 22 | 4 | 91.09 | −0.18 | 4.81 |
| 23 | 10 | 91.76 | −0.29 | 4.24 |
| 24 | 7 | 92.50 | −0.04 | 5.42 |
| 25 | 5 | 92.80 | −0.20 | 4.20 |
| 26 | 9 | 94.30 | −0.37 | 3.91 |
| 27 | 10 | 95.04 | −0.55 | 3.05 |

TABLE 3.2

| Sample | Masked/Unmasked | 10 Day QUV Exposure | | |
|---|---|---|---|---|
| | | L* | a* | b* |
| 1 | Mask | 92.65 | 1.51 | 5.78 |
| | Unmask | 93.74 | −0.52 | 3.13 |
| 2 | Mask | 93.54 | 1.29 | 5.83 |
| | Unmask | 95.05 | −0.41 | 3.07 |
| 3 | Mask | 93.14 | 0.57 | 5.69 |
| | Unmask | 93.89 | −0.41 | 3.38 |
| 4 | Mask | 93.72 | 0.12 | 4.93 |
| | Unmask | 94.43 | −0.40 | 3.36 |
| 5 | Mask | 93.96 | −0.14 | 4.29 |
| | Unmask | 93.73 | −0.35 | 3.53 |
| 6 | Mask | 88.88 | 0.03 | 4.37 |
| | Unmask | 90.95 | −0.36 | 1.97 |
| 7 | Mask | 91.78 | −0.16 | 4.86 |
| | Unmask | 90.62 | −0.18 | 2.03 |
| 8 | Mask | 92.72 | −0.40 | 3.76 |
| | Unmask | 93.41 | −0.51 | 2.35 |
| 9 | Mask | 93.39 | −0.47 | 3.02 |
| | Unmask | 92.68 | −0.39 | 2.18 |
| 10 | Mask | 91.17 | −0.26 | 3.33 |
| | Unmask | 90.99 | −0.13 | 2.23 |
| 11 | Mask | 90.61 | −0.07 | 4.90 |
| | Unmask | 91.11 | −0.43 | 2.34 |
| 12 | Mask | 89.40 | 0.06 | 4.50 |
| | Unmask | 90.80 | −0.23 | 2.22 |
| 13 | Mask | 92.57 | −0.20 | 4.09 |
| | Unmask | 92.51 | −0.33 | 2.20 |
| 14 | Mask | 91.81 | −0.08 | 4.59 |
| | Unmask | 91.73 | −0.20 | 2.22 |
| 15 | Mask | 95.05 | −0.35 | 3.46 |
| | Unmask | 94.64 | −0.35 | 3.74 |
| 16 | Mask | 93.17 | 0.97 | 6.33 |
| | Unmask | 94.85 | −0.46 | 3.14 |
| 17 | Mask | 94.35 | 0.49 | 5.19 |
| | Unmask | 95.28 | −0.48 | 3.24 |
| 18 | Mask | 95.34 | −0.29 | 4.50 |
| | Unmask | 95.58 | −0.54 | 3.62 |
| 19 | Mask | 95.39 | −0.51 | 3.95 |
| | Unmask | 95.20 | −0.53 | 4.12 |
| 20 | Mask | 88.80 | 0.08 | 5.40 |
| | Unmask | 90.85 | −0.15 | 2.42 |
| 21 | Mask | 85.82 | 0.34 | 3.91 |
| | Unmask | 86.76 | 0.28 | 1.99 |
| 22 | Mask | 89.04 | −0.05 | 4.68 |
| | Unmask | 88.53 | 0.04 | 2.53 |
| 23 | Mask | 92.76 | −0.40 | 4.15 |
| | Unmask | 93.56 | −0.43 | 2.58 |
| 24 | Mask | 91.51 | 0.07 | 6.20 |
| | Unmask | 93.20 | −0.36 | 2.82 |
| 25 | Mask | 93.19 | −0.18 | 4.35 |
| | Unmask | 93.44 | −0.34 | 2.60 |
| 26 | Mask | 94.06 | −0.37 | 3.46 |
| | Unmask | 94.26 | −0.40 | 2.41 |
| 27 | Mask | 95.59 | −0.63 | 2.76 |
| | Unmask | 94.49 | −0.57 | 3.04 |

Data Results

The following discussion relates to initial whiteness, color retention/stability and release properties of the treated composite substrates in Example 3. The data shows that color stability improved with the addition of ground ion exchange resin in the aqueous coating composition. With respect to yellowing or darkening of the coated composite substrates, incorporation of the ion exchange resin reduced this effect and showed an improved initial whiteness for all binders. A general trend of increasing color retention/stability to increasing levels of ion exchange resin is observed. Similarly, release properties are improved upon addition of ion exchange resin.

What is claimed is:

1. A method for the manufacture of an in-press coated composite substrate, comprising:

(a) applying a sealing layer of an aqueous coating composition to a surface of a compressible mat, wherein the mat comprises a resin and one or more of fibers, chips or particles;

(b) compressing the mat and applied sealing layer of coating composition between heated metal surfaces in a press; and (c) releasing the compressed, coated composite substrate from the press; characterized in that the sealing layer of aqueous coating composition comprises an aqueous emulsion sepolymer and a ground ion exchange resin.

2. The method of claim 1 wherein the mat comprises one or more compositions selected from cellulose, glass, synthetic polymers, carbon and organic or inorganic cementitious compositions and combinations thereof.

3. The method of claim 1 wherein the emulsion polymer is selected from (meth)acrylic ester monomers, methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, (meth)acrylonitrile, (meth)acrylamide, amino-functional monomers, ureido-functional monomers, monomers bearing acetoacetate-functional groups, styrene, substituted styrenes, butadiene, ethylene, propylene, α-olefins, 1-decene, vinyl acetate, vinyl butyrate, vinyl esters, vinyl monomers, vinyl chloride, vinylidene chloride and combinations thereof.

4. The method of claim 1 wherein the ion exchange resin is selected from anion exchange resins, cation exchange resins, mixed bed resins and combinations thereof.

5. The method of claim 1 wherein the ion exchange resin is at least 3.5 percent solid ion exchange resin base on coating polymer solids.

6. The method of claim 1 wherein the ion exchange resin is at least 1.7 percent solid ion exchange resin based on coating polymer solids.

\* \* \* \* \*

UNITED STATES PATENT AND TRADEMARK OFFICE
CERTIFICATE OF CORRECTION

PATENT NO. : 6,756,075 B2 Page 1 of 1
DATED : June 29, 2004
INVENTOR(S) : Anne S. DeMasi and Rosemarie Palmer Lauer It is certified that error appears in the above-identified patent and that said Letters Patent is hereby corrected as shown below:

<u>Column 10,</u>
Line 30, after "emulsion", delete "sepolymer" and insert -- polymer --.

Signed and Sealed this

Seventh Day of March, 2006

JON W. DUDAS
*Director of the United States Patent and Trademark Office*